Feb. 5, 1957    L. E. HILL ET AL    2,780,784

RADIO-FREQUENCY ENERGY-TRANSFER DEVICE

Filed Jan. 27, 1953

INVENTOR:
Lester E. Hill
and Harold P. Lyman,
BY Owens, McDougal, Williams & Hersh,
ATTORNEYS.

United States Patent Office 2,780,784
Patented Feb. 5, 1957

2,780,784

RADIO-FREQUENCY ENERGY-TRANSFER DEVICE

Lester E. Hill, Nashville, Tenn., and Harold T. Lyman, Milford, Conn., assignors to Aladdin Industries, Incorporated, Chicago, Ill., a corporation of Illinois Application January 27, 1953, Serial No. 333,591

5 Claims. (Cl. 333—24)

Figures 1, 2, 3, 4, 5:
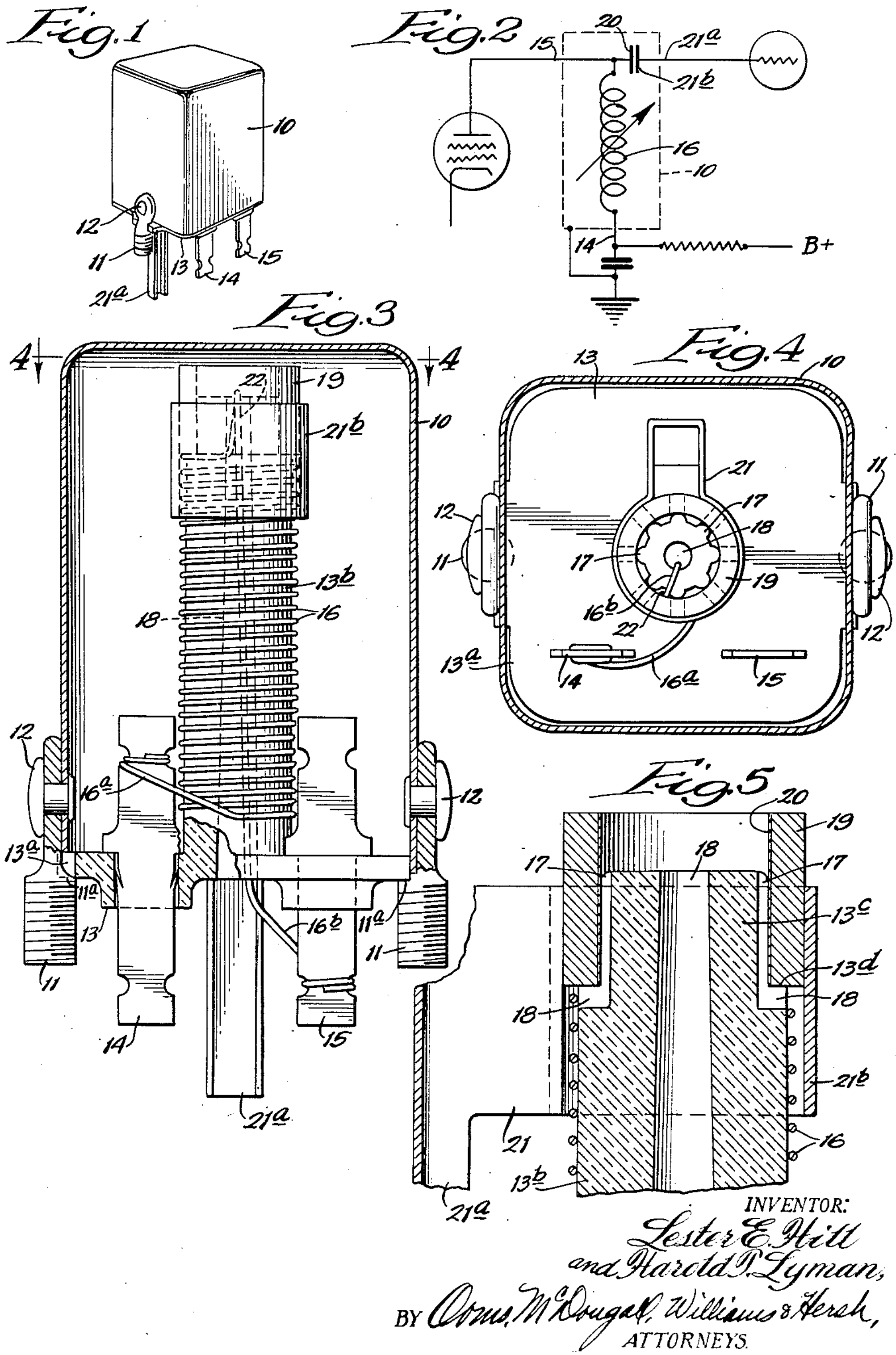

This invention relates to radio-frequency energy-transfer devices; it is particularly concerned with a novel interstage coupling unit adapted for use as an I. F. transformer or coupling device in wave-signal receivers.

While our invention is susceptible of many applications, it is particularly well adapted for use in the I. F. amplifiers of television receivers, radar receivers, and other types of superheterodyne radio receivers.

Our invention is distinguished by extraordinary structural simplicity and economy of manufacture, while at the same time it possesses a high degree of flexibility and adjustability.

The electrical performance of our invention is equal or superior to that of prior art interstage coupling devices, all of which, so far as we know, are substantially more complicated and more expensive to make.

It may accordingly be said that the principal object of the present invention is to provide an interstage coupling device, particularly designed for use in television and other V. H. F. and U. H. F. receivers, characterized by extreme simplicity of construction and hence by very low manufacturing cost.

More specifically, in furtherance of the primary object, it is an additional object of the present invention to provide an interstage coupling device comprising an inductance coil and a coupling condenser in which one of the elements of the coupling condenser is employed in a novel manner to provide circuit tuning by variation of the coil inductance.

A still further object of the present invention is to provide, in a radio-frequency coupling device having an inductance coil, a slidable sleeve which may be moved axially to vary the inductance of the coil, the coil being surmounted by a cooperating conductor element adapted to form with said sliding sleeve a coupling condenser for transferring energy from the coil to a suitable load device such as the grid of the succeeding amplifier tube.

Among the other objects of the invention is the novel object of enlarging the capacitance of the coupling condenser just referred to by forming the aforesaid cooperating conductor element in part of titanium oxide or other suitable high-dielectric-constant ceramic.

Still other objects and advantages of the invention will appear from the detailed description of the invention which follows:

In the accompanying drawing we have shown in considerable detail an illustrative embodiment of our invention, as it may conveniently be adapted for mass-production low-cost manufacture. In Fig. 1, we have shown in perspective a view of a typical embodiment of our invention, as it appears after final assembly. Fig. 2 is a fragmentary schematic diagram showing the electrical circuit of our invention and showing also the manner in which our invention will normally be connected into circuit with the conventional elements of an amplifier. Fig. 3 is a partially sectional view of the embodiment of Fig. 1, the section being taken in a vertical plane. Fig. 4 is a horizontal sectional view of the device of Fig. 1, taken along the line 4—4 of Fig. 3; Fig. 4 might be described as a plan view of our invention as it would appear with the upper portion of the shield can removed. Fig. 5 is an enlarged sectional view of the upper portion of the inductance coil which forms a part of our invention, the purpose of the view being to bring out in detail the construction of that portion of the apparatus.

Referring now to the drawing we have shown therein an embodiment of our invention which is carried within a casing or shield can 10, of the type conventionally used for enclosing I. F. transformers. The shield can 10 may be provided with a pair of threaded mounting members 11 suitably riveted to shield can 10 by means of rivets 12. Those familiar with assembly of radio apparatus will understand that the unit may be mounted over a suitably perforated chassis by inserting the mounting elements 11 into a pair of suitable apertures and securing the same in place by tightening nuts on the threaded terminals of elements 11.

The electrical elements of our invention are carried on a molded frame 13, which may be fashioned from plastic, ceramic, or other suitable insulating material. In the low-cost, mass-production embodiment we prefer to use polystyrene or other suitable low-cost inexpensive plastic as the material for frame 13.

Frame 13 is provided with a pair of oppositely disposed notches **13*a* which are adapted to rest upon and be secured by a pair of ledges or shoulders 11*a* formed in the elements 11 immediately above the threaded terminal portions. As may be seen from a study of Fig. 3, the electrical components of our invention may be first assembled on molded frame 13, and the frame may then be inserted within the shield can 10. At that stage of assembly, the mounting elements 11 may be riveted to can 10 and the ledges or shoulders 11*a* will thereupon hold the frame 13 securely against the underedge of shield can 10**.

Frame 13 comprises a base plate **13*a* and a central cylindrical upward extension 13*b*. Base plate 13*a* and extension 13*b*** may be integrally molded or they may be separately formed and cemented together.

Base plate **13*a* is provided with three apertures. Two of those apertures are narrow slots adapted to receive terminal lugs 14 and 15, while the third aperture is generally square in shape and is adapted to receive rather snugly the channel-shaped member 21*a*** which will be described in detail in a subsequent paragraph.

The central cylindrical extension **13*b* serves as a form for an inductance coil 16, made up of a plurality of turns of wire, suitably disposed on the surface of extension 13*b*. For a typical application, such as a 41.25 mc. I. F. transformer, the cylindrical extension 13*b* may have a diameter of approximately one-quarter inch, and the inductance coil 16 wound thereon may consist of perhaps twenty-odd turns of small copper wire, such as #36 enamelled wire. Depending on the intended frequency range of the completed coupling device, the inductance coil 16** may or may not have its turns spaced.

Any suitable means of anchoring the coil 16 in the desired position on extension **13*b* may be used. The simplest and most effective anchoring technique, we believe, is to coat the surface of extension 13*b* with a thin layer of plastic cement before the coil 16 is wound thereon. When the plastic cement sets, the coil 16** will be tightly anchored in the proper position.

The lower end of coil 16 terminates in a wire lead **16*a* which is carried to terminal lug 14**, to which it may be soldered.

In the embodiment shown, the upper end of extension **13*b* is modified by having molded therein a reduced-diameter portion 13*c*, such reduced-diameter portion extending centrally above the main body of extension 13*b* and providing thereby an annular shoulder 13*d***.

The outer surface of the reduced-diameter extension **13*c* is provided with a plurality of spaced flutes or axial ridges 17. The recessed zones between adjacent flutes 17 are carried axially downward on extension 13*b* somewhat lower than the lowest extension of the flutes 17, providing, as shown clearly in Fig. 5, a group of passageways 18 through which a wire may pass from the outer surface of extension 13*b* upward between adjacent flutes 17**.

The upper end of inductance coil 16 terminates in a wire lead **16*b* which, as shown in Figs. 3 and 4, passes through one of the passages 18, upward between flutes 17 to the top of extension 13*c*, over, and downwardly through the central aperture 18 which passes entirely through frame extension 13*b* and the reduced-diameter portion thereof 13*c*. Upon passing outward from the lower end of central aperture 18 wire lead 16*b* goes to terminal lug 15**, to which it may be soldered.

Snugly seated upon the shoulder **13*d* and surrounding the reduced-diameter extension 13*c* is a cylindrical ceramic collar 19, formed to fit snugly over the flutes 17, Preferably, collar 19** is made from a suitable titanium oxide compound or other ceramic material characterized by a high-dielectric-constant. Many such compounds are in common use today in the radio art, and it is accordingly believed unnecessary to describe them with particularity.

The inner cylindrical surface of collar 19 is coated with a thin layer of metal 20 which, if desired, may be chemically deposited thereon. Alternatively, conducting layer 20 may be an actual cylindrical core or insert, formed of thin sheet metal, metal foil, or other suitable conductive material.

In passing upward between the flutes 17 and adjacent the conducting surface 20, wire lead **16*b* is joined electrically to the conducting surface 20. This may, if desired, be accomplished by means of a solder joint 22, as indicated in Fig. 4, or it may be in some instances feasible to rely merely on a friction contact between wire lead 16*d* and conducting surface 20. In any event, any enamel or other insulating coating on wire lead 16*b* must be removed in the zone of contact so as to assure a good conductive connection between wire leads 16*b* and the cylindrical conducting surface 20 which is carried on the inner cylindrical surface of collar 19**.

Mounted over and snugly in contact with collar 19 is a metal sleeve 21, provided with a channel-shaped downward extension **21*a*, extending the full length of extension 13*b* and downward through the aperture in the base plate 13*a* heretofore mentioned. A sufficient length of extension 21*a* should extend below base plate 13*a* to permit convenient manipulation of sleeve 21 by means of extension 21*a***.

The upper portion of sleeve 21 comprises a cylindrical member **21*b* which fits snugly around the outer surface of collar 19. Member 21*b*** may, if desired, be provided with a narrow axial gap so as to avoid its forming a closed conducting loop. We have found, however, that the apparatus works very well, and with amply high "Q" when the sleeve is formed as a closed cylinder as shown.

The aperture in base plate **13*a* through which extension 21*a* passes may be shaped to receive the channel-shaped member 21*a* with a reasonably snug fit, but loose enough to permit sleeve 21 to be moved axially by manipulation of extension 21*a*. As will be more fully explained presently, a suitable wedge element, of plastic, fiber, or other material (not shown), may be inserted in the aperture in base plate 13*a* through which extension 21*a* passes, in order effectively to secure sleeve 21** in the proper position after it has been appropriately adjusted.

*Operation*

As may be seen from Fig. 2, our coupling device consists, electrically, of a shielded inductance coil 16 having variable inductance and being provided with two external terminals, one of which, terminal 15, will normally be connected to the plate of a preceding amplifier tube, while the other terminal 14 will normally be bypassed to ground, as shown in Fig. 2, and also connected to a suitable source of biasing voltage for the plate of said amplifier tube.

Our invention also involves, as an additional electrical element, a coupling condenser formed by conductor 20 and sleeve **21*b*, the dielectric of such condenser being the ceramic collar 19. External electrical connection to the condenser just described may be accomplished via extension 21*a***, which, as diagrammatically indicated on Fig. 2, may function as an external terminal element as well as an adjusting device.

In the operation of our invention, the sleeve **21*b* may be moved axially of coil 16, by suitable manipulation of extension 21*a*, at the time the apparatus is initially tuned or "balanced." Variation in the position of sleeve 21 will change the inductance of coil 16 by a small percentage, due to the distorting effect on the magnetic field of the metallic sleeve 21*b*. This variation of inductance is not accompanied, however, by any appreciable increase in circuit losses, since the sleeve 21*b*** does not form a complete electrical loop and does not carry eddy currents in any appreciable quantity.

Over its entire range of adjustment, a substantial portion of sleeve **21*b* remains in intimate contact with collar 19, so that throughout the full range of adjustment of sleeve 21 the capacitance between sleeve 21*b* and conductor 20 changes by less than 50%. The capacitance of a coupling condenser, such as the one under consideration, is not ordinarily critical so long as it is sufficiently great to provide good energy transfer at the frequency of operation. Therefore, the behavior of the circuit is not ordinarily affected noticeably by the particular final position to which sleeve 21** is adjusted.

The dimensions of collar 19 and sleeve 21 are of course chosen so as to provide a small clearance between the inner surface of sleeve **21*b* and the wire which forms inductance coil 16, since it is not desirable that sleeve 21*b*** rub on the surface of the wire.

We have found that a sufficient range of frequency variation can be accomplished by movement of sleeve 21 to compensate easily for individual variations in circuit capacitance, tube capacitance, etc., such as are encountered in production of radio equipment. It is easily possible, for example, to change by 4 or 5 mc. the resonant frequency of a 41.25 mc. I. F. transformer embodying our invention. That is a far greater tuning range than is necessary to compensate for the variations in circuit and tube capacitance normally encountered.

Thus our invention provides a highly satisfactory and electrically efficient interstage coupling device having far simpler and less expensive construction than any prior art device of our knowledge capable of accomplishing a similar result.

While the illustrated embodiment of our invention shows a coupling capacitor formed by sleeve **21*b* and conducting surface 20, tuning of the coil being accomplished by axial movement of the external sleeve 21*b*, it will be apparent to persons skilled in the art that an equivalent electrical effect might be obtained by employing a centrally disposed metal slug for tuning the coil, in which case the relative positions of the fixed and movable condenser plates would be transposed. In other words, if a central slug were to be used instead of sleeve 21*b*, conducting surface 20 might be deposited on the outer surface of the ceramic collar 19**, the inner surface thereof then functioning to receive and guide the tuning slug, which, as with the illustrated embodiment of our invention, would serve in the double role of tuning element and condenser plate.

Similarly, it will be understood that the illustrated physical arrangement of the sleeve **21*b*, the coil 16, and the collar 19 are merely typical examples which may be altered substantially to meet varying conditions. To illustrate, sleeve 21*b* may if desired be substantially lengthened in its axial dimension, so that the sleeve completely overlies collar 19 even when the sleeve is at its lowermost tuning position. Such an arrangement substantially reduces the change in coupling capacitance that takes place during tuning. That is, whereas the illustrated arrangement will have a change in coupling capacitance of the order of 50% from one extreme tuning position to the other, a construction having an elongated sleeve 21*b* will have a change in capacitance of only 10% to 15%. Such an arrangement, of course, does require a greater clearance between the top of the frame extension 13*c* and the top portion of shield can 10. The particular relative dimensions adopted for a given application are a matter of choice, to be determined by the electrical requirements. In practically all applications, the capacitance of the coupling condenser formed by conducting surface 20 and sleeve 21*b* is not critical. In fact, in some cases, particularly in U. H. F. applications, sufficient coupling capacitance for good energy transfer can be obtained by the capacitance between the sleeve 21*b* and the wire of coil 16. Where that is true, it is possible to dispense with collar 19 and conducting surface 20, replacing them with any convenient means of supporting sleeve 21*b* in a suitably spaced relationship to coil 16** such that the sleeve can be moved axially of the coil without actually making contact with it.

We have in the foregoing description of our invention assumed that our coupling device would be connected in such a way that energy would be fed into the device via terminals 14 and 15 and that energy would be taken off via a suitable connection to extension **21*a*. Persons familiar with the art will of course understand that the device may readily be employed in the reverse manner, with energy being applied via terminals 21*a* and 14, energy in such event being taken off between terminals 15 and 14**.

While we have in the present specification described in considerable detail for illustrative purposes a specific embodiment of our invention and have described a number of variants thereon, it is to be understood that we claim as our invention the various novel features defined in the appended claims and are not limiting ourselves to the particular structure shown in the drawing and described in the specification.

We claim:

1. In combination, an inductance coil, a condenser plate fixedly mounted relative to one end of said coil and connected electrically thereto, a conducting sleeve movably mounted adjacent said condenser plate coaxially of said coil, said sleeve being insulatedly mounted relative to said coil to provide a limited range of axial relative movement between said sleeve and said coil, said sleeve overlying a portion of said coil in at least a part of said range of movement, means for moving said sleeve to any predetermined position within said range of movement, and connector means coupled to said coil adapted to afford energy interchange between said coil and an external circuit, the combination of said conducting sleeve and said moving means providing also means adapted to effect an external circuit connection to said sleeve for energy exchange with said coil by capacitance transfer via said sleeve and said condenser plate, the axial movement of said sleeve being operative to tune said coil.

2. Apparatus according to claim 1 wherein the mounting means for said sleeve comprises a ceramic collar fixedly mounted coaxially of said coil and having said condenser plate disposed in intimate contact with its inner surface, said sleeve being carried in slidable contact with the outer cylindrical surface of said collar.

3. Apparatus according to claim 1 wherein a ceramic dielectric element is interposed between said condenser plate and said movable sleeve, whereby the capacitance between said elements is substantially increased, said ceramic element serving also as an insulating support for said movable sleeve.

4. An interstage coupling device for a tuned vacuum tube amplifier comprising a perforated base formed of insulating material, a central extension disposed substantially perpendicular to said base and providing a coil form, an inductance coil wound on said form, a pair of terminal lugs mounted on said base, conducting leads respectively connecting said terminal lugs to the opposite ends of said inductance coil, a cylindrical metallic condenser plate fixedly mounted coaxially of said coil and electrically connected to one end thereof, a conducting movable sleeve insulatedly mounted relative to said condenser plate and coil for limited axial movement through a zone at least partially overlying said condenser plate and the adjacent end portion of said coil, and an extension on said sleeve passing generally parallel to the axis of said coil and through an aperture in said base, said extension providing means adapted to effect an external electrical connection to said sleeve and providing also means for manual axial movement of said sleeve relative to said coil.

5. Apparatus according to claim 4 wherein a ceramic collar is mounted near one end of said coil in fixed relation thereto, said cylindrical condenser plate being carried on the inner surface of said collar, said collar also serving as insulating mounting for said sleeve, said sleeve being throughout its range of movement at least partially in intimate contact with the outer surface of said ceramic collar.

References Cited in the file of this patent

UNITED STATES PATENTS

| | | |
|---|---|---|
| 1,866,845 | Edison | July 12, 1932 |
| 2,134,794 | Muth et al. | Nov. 1, 1938 |
| 2,187,340 | Wilhelm et al. | Jan. 16, 1940 |
| 2,250,366 | Frisbee | July 22, 1941 |
| 2,338,134 | Sands et al. | Jan. 4, 1944 |
| 2,394,391 | Martowicz | Feb. 5, 1946 |
| 2,422,458 | Amy et al. | June 17, 1947 |
| 2,465,102 | Joy | Mar. 22, 1949 |
| 2,534,854 | Clapp | Dec. 19, 1950 |
| 2,583,854 | Kehbel | Jan. 29, 1952 |
| 2,641,708 | Carlson | June 9, 1953 |
| 2,659,056 | Stroh | Nov. 10, 1953 |
| 2,728,052 | Van Duyne | Dec. 20, 1955 |